US010354271B2

(12) United States Patent
Chen et al.

(10) Patent No.: US 10,354,271 B2
(45) Date of Patent: Jul. 16, 2019

(54) ELECTRONIC DEVICE AND PLAY AND INTERACTIVE METHOD FOR ELECTRONIC ADVERTISING

(71) Applicant: AOPEN INC., New Taipei (TW)

(72) Inventors: Chang-Yu Chen, New Taipei (TW); Huei-Ju Liao, New Taipei (TW)

(73) Assignee: AOPEN INC., Taipei (TW)

( * ) Notice: Subject to any disclaimer, the term of this patent is extended or adjusted under 35 U.S.C. 154(b) by 82 days.

(21) Appl. No.: 15/286,583

(22) Filed: Oct. 6, 2016

(65) Prior Publication Data

US 2017/0344176 A1 Nov. 30, 2017

Related U.S. Application Data

(60) Provisional application No. 62/343,140, filed on May 31, 2016.

(30) Foreign Application Priority Data

Jul. 27, 2016 (TW) .............................. 105123692 A

(51) Int. Cl.
*G06F 3/147* (2006.01)
*G06Q 30/02* (2012.01)
(Continued)

(52) U.S. Cl.
CPC ..... *G06Q 30/0241* (2013.01); *G06F 3/04883* (2013.01); *G06F 3/0482* (2013.01);
(Continued)

(58) Field of Classification Search
CPC .............. G06F 3/04886; G06F 3/1446; G06F 3/04883; G06F 3/0482; G06F 3/04817;
(Continued)

(56) References Cited

U.S. PATENT DOCUMENTS 6,864,882 B2 * 3/2005 Newton ................ G06F 3/0421
345/156
7,978,184 B2 * 7/2011 Morrison ............... G06Q 30/02
173/177
(Continued)

FOREIGN PATENT DOCUMENTS

CN 102655644 9/2012
TW 201203056 1/2012
(Continued)

OTHER PUBLICATIONS

"Office Action of Taiwan Counterpart Application," issued on Apr. 14, 2017, with English translation thereof, p. 1-p. 11, in which the listed references were cited.

*Primary Examiner* — Michael J Jansen, II
(74) *Attorney, Agent, or Firm* — JCIPRNET

(57) ABSTRACT

An electronic device and a play and interactive method for an electronic advertising are provided. The electronic device includes a touch module, a display, a static information presentation structure and a data processing device. The touch module has a touch area for providing position of a measured object in the touch area. The display has a display area set in the touch area. The touch area is composed of the display area and a non-display area. The static information presentation structure is disposed on the non-display area. The data processing device determines whether the measured object performs a operation in the display area or the non-display area according to the position of the measured object provided by the touch module. When the operation is located in the non-display area, the data processing device displays a corresponding data in the display area according to position of the operation.

15 Claims, 4 Drawing Sheets

(51) Int. Cl.
*G06F 3/0481* (2013.01)
*G06F 3/0482* (2013.01)
*G06F 3/0484* (2013.01)
*G06F 3/0488* (2013.01)

(52) U.S. Cl.
CPC ...... *G06F 3/04817* (2013.01); *G06F 3/04842* (2013.01); *G06F 3/04886* (2013.01); *G06F 3/147* (2013.01)

(58) Field of Classification Search
CPC .. G06F 3/04842; G06F 3/147; G06Q 30/0241
See application file for complete search history.

(56) References Cited

U.S. PATENT DOCUMENTS

| | | | | |
|---|---|---|---|---|
| 8,493,339 | B1* | 7/2013 | Feehan | G06F 3/1423 345/173 |
| 8,576,202 | B2* | 11/2013 | Tanaka | G06F 3/0416 345/177 |
| 8,717,316 | B2* | 5/2014 | Gothard | G06Q 30/02 345/173 |
| 9,144,328 | B2* | 9/2015 | Seeley | A47F 3/043 |
| 9,311,834 | B2* | 4/2016 | Lee | G09F 9/35 |
| 9,360,929 | B2* | 6/2016 | Noda | G06F 3/005 |
| 9,582,743 | B2* | 2/2017 | Akiyama | G06K 15/005 |
| 9,626,016 | B2* | 4/2017 | Heikel | G06F 3/041 |
| 10,235,586 | B2* | 3/2019 | Hou | G06F 3/0321 |
| 2002/0063714 | A1* | 5/2002 | Haas | G06F 17/30017 345/473 |
| 2002/0118177 | A1* | 8/2002 | Newton | G06F 3/0421 345/173 |
| 2008/0192027 | A1* | 8/2008 | Morrison | G06F 3/043 345/177 |
| 2010/0123668 | A1* | 5/2010 | Kuhn | G06F 3/0488 345/173 |
| 2011/0145073 | A1* | 6/2011 | Richman | G06Q 30/02 705/14.66 |
| 2011/0234545 | A1* | 9/2011 | Tanaka | G06F 3/0436 345/177 |
| 2012/0102438 | A1* | 4/2012 | Robinson | G06F 3/011 715/863 |
| 2012/0105424 | A1* | 5/2012 | Lee | G09F 9/35 345/212 |
| 2013/0009863 | A1* | 1/2013 | Noda | G06F 3/005 345/156 |
| 2013/0211923 | A1* | 8/2013 | Yuill | G06Q 30/0276 705/14.72 |
| 2014/0125605 | A1* | 5/2014 | Lin | G06F 1/1601 345/173 |
| 2014/0125631 | A1* | 5/2014 | Lin | G06F 3/0488 345/175 |
| 2014/0172523 | A1* | 6/2014 | Stob | A47K 5/1217 705/14.4 |
| 2015/0062073 | A1* | 3/2015 | Heikel | G06F 3/041 345/174 |
| 2015/0253930 | A1* | 9/2015 | Kozloski | G06F 3/04817 345/175 |
| 2015/0278624 | A1* | 10/2015 | Hou | G06F 3/0321 345/179 |
| 2015/0347875 | A1* | 12/2015 | Akiyama | G06K 15/005 358/1.15 |
| 2017/0344176 | A1* | 11/2017 | Chen | G06F 3/1446 |

FOREIGN PATENT DOCUMENTS

TW 201407513 2/2014
WO 2011119368 9/2011

\* cited by examiner

ELECTRONIC DEVICE AND PLAY AND INTERACTIVE METHOD FOR ELECTRONIC ADVERTISING

CROSS-REFERENCE TO RELATED APPLICATION

This application claims the priority benefits of U.S. provisional application Ser. No. 62/343,140, filed on May 31, 2016 and Taiwan application serial no. 105123692, filed on Jul. 27, 2016. The entirety of each of the above-mentioned patent applications is hereby incorporated by reference herein and made a part of this specification.

BACKGROUND OF THE INVENTION

Field of the Invention

The invention relates to an electronic device having a display function, and particularly relates to an electronic device and a play and interactive method for electronic advertising.

Description of Related Art

Along with development of technology, construction cost of large-scale displays is gradually decreased. Therefore, various advertisings can be played and delivered by electronic billboards constructed by light-emitting diode (LED) displays or liquid crystal displays (LCD), so as to promote new products or raise awareness of stores and products.

A general electronic billboard is usually implemented by a whole display screen, so as to dynamically present advertising images to draw attentions of pedestrians or consumers. However, such kind of billboards cannot interact with the pedestrians or consumers, which is slightly inadequate in capability of attracting the interest and purchase desire of the pedestrians/consumers. Comparatively, if a whole touch screen is adopted to serve as the electronic billboard, a construction and maintenance cost thereof is too high. Therefore, manufactures hope to manufacture an electronic billboard capable of interacting with pedestrians, and decrease a construction and operating cost thereof.

SUMMARY OF THE INVENTION

The invention is directed to an electronic device and a play and interactive method for electronic advertising, by which a single touch frame is adopted to achieve interaction between advertising played on an electronic billboard, a digital whiteboard and a user, and decrease a construction cost thereof.

The invention provides an electronic device including a touch module, a display, a static information presentation structure and a data processing device. The touch module has a touch area for providing a position of a measured object in the touch area. The display has a display area. The display area is set in the touch area. The touch area is composed of the display area and a non-display area, and the display area is smaller than the touch area. The static information presentation structure is disposed on the non-display area. The data processing device is coupled to the touch module and the display. The data processing device is configured to determine whether the measured object performs an operation in the display area or the non-display area according to the position of the measured object provided by the touch module. When the operation is located in the non-display area, the data processing device displays corresponding information in the display area according to a position of the operation.

The invention provides a play and interactive method for electronic advertising, which is adapted to an electronic device. The electronic device includes a display area, a non-display area and a touch area covering the display area and the non-display area. The play and interactive method includes following steps. A position of a measured object located in the touch area is detected. It is determined whether the measured object performs an operation in the non-display area according to the position of the measured object. When the operation is located in the non-display area, corresponding information is displayed in the display area according to a position of the operation.

According to the above description, the electronic device of the invention may implement diversified functions through a touch frame, the display and the static information presentation structure, such as interactive electronic advertising, a touch screen, digital writing, remote conference, to share an image to a user equipment, etc. In other words, the electronic device may implement interaction between the user and the advertising played on the electronic billboard, the digital whiteboard, etc. through a single touch frame, and a construction cost thereof is decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In order to decrease a construction cost and implement diversified functions, in the electronic device of the invention, a single touch frame is adopted in collaboration with a display and a static information presentation structure to implement the above diversified functions, for example, implement interaction between the user and the advertising played on electronic billboard, digital whiteboard, remote conference equipment, etc. Embodiments complied with the spirit of the invention are provided below, and those skilled in the art may properly adjust contents thereof for implementation.

Figure 1:
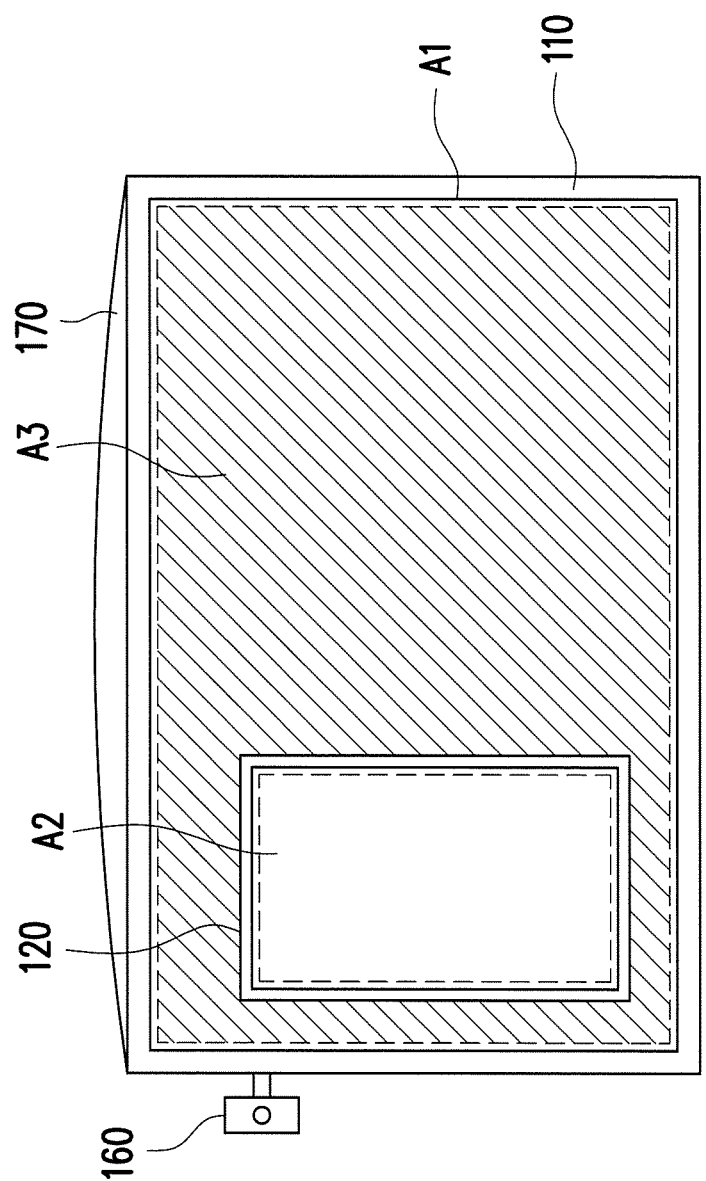
FIG. 1 is a schematic diagram of an electronic device according to an embodiment of the invention.
Figure 2:
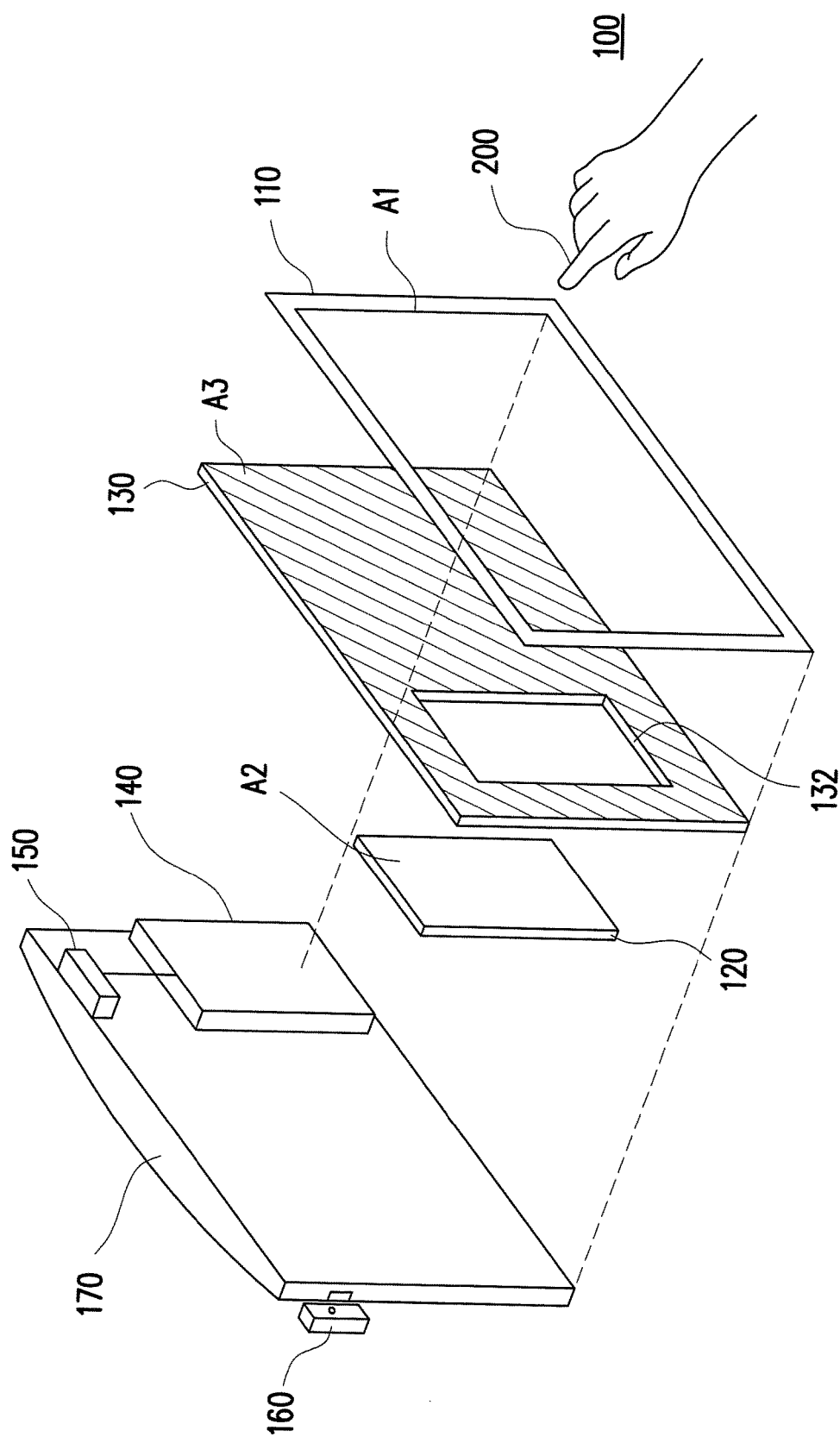
FIG. 2 is a schematic diagram of an exploded view of an electronic device according to an embodiment of the invention.

FIG. 1 is a schematic diagram of an electronic device 100 according to an embodiment of the invention. FIG. 2 is a schematic diagram of an exploded view of the electronic device 100 according to an embodiment of the invention. Referring to FIG. 1 and FIG. 2, the electronic device 100 mainly includes a touch module 110, a display 120, a static information presentation structure 130 and a data processing device 140. The data processing device 140 is coupled to the touch module 110 and the display 120. According to FIG. 2, it is known that the electronic device 100 further includes a device back plate 170. The display 120 and the data processing device 140 is disposed between the touch module 110 and the device back plate 170.

The touch module 110 is used for defining a touch area A1. In order to decrease the construction cost of the electronic device 100, the present embodiment may adopt an infrared touch frame to implement the touch module 110. The infrared touch frame is, for example, implemented by respectively disposing a plurality of infrared transmitters and infrared receivers in stripe arrangement at two corresponding left and right sides and two corresponding upper and lower sides of a rectangular frame, so as to produce the touch area A1 through lateral and vertical cross scan. In this way, coordinate position of a measured object 200 (for example, user's finger, a whiteboard stylus, etc.) in the touch area A1 can be obtained according to an infrared touch sensing technique (for example, blocking). In some embodiments in consistent with the spirit of the invention, the touch module 110 can be implemented through various touch techniques such as optical touch of an image sensor, capacitive touch of a capacitive sensing panel or acoustic wave touch of a surface acoustic wave touch panel configured at two corners of the touch frame, which is not limited by the invention.

The display 120 is a planar display without the touch function, and has a display area A2. The display area A2 is configured in the touch area A1. In other words, the touch area A1 can be composed of the display area A2 and a non-display area A3. The display area A2 is obviously smaller than the touch area A1. For example, when the touch area A1 is 80 inches, the display 120 is 42 inches or 38 inches, i.e. the display area A2 is 42 inches or 38 inches. The display 120 can be embedded in an opening 132 of the static information presentation structure 130 (i.e. the display 120 is surrounded by the static information presentation structure 130), or disposed by neighbouring to the static information presentation structure 130 (i.e. the display 120 and the static information presentation structure 130 proportionally divide the touch area A1). Preferably, a surface of the display area A2 and a surface of the non-display area A3 are coplanar. The display 120 can be one of a LED display, an OLED display, a full color electronic paper (e-paper) display and a black and white e-paper display. Those skilled in the art may use different display imaging techniques to implement the display 120.

The static information presentation structure 130 is disposed on the non-display area A3. The static information presentation structure 130 of the present embodiment may have an advertising placement structure for placing static advertising such as poster, etc. The static information presentation structure 130 may have a writing surface at the non-display area A3. The writing surface can be a whiteboard, or implemented by a frosted glass, an acrylic material adapted to using a specific pen (for example, the whiteboard stylus) to write thereon.

The data processing device 140 can be a host computing device or a microcomputer, which is, for example, implemented by a central processor in collaboration with a storage medium. In the present embodiment, the electronic device 100 may selectively include a wireless transmission device 150 and an image capturing device 160. The wireless transmission device 150 is, for example, a hardware or firmware module having a wireless transmission protocol function such as a Wi-Fi transmission module, a Bluetooth transmission module, etc. The image capturing device 160 can be a camera or a video camera. The wireless transmission device 150 and the image capturing device 160 are disposed on the device back plate 170. Those skilled in the art may adjust configuration positions of the data processing device 140, the wireless transmission device 150 and the image capturing device 160 in the electronic device 100 according to an actual requirement, and the invention is not limited to the state shown in the embodiment of FIG. 2. The data processing device 140 is configured to determine whether the measured object 200 performs a click operation in the display area A2 or the non-display area A3 according to the position of the measured object 200 provided by the touch module 110. If the click operation is located in the non-display area A3, the data processing device 140 displays corresponding information in the display area A2 according to a position of the click operation. More implementations complied with the embodiment of the invention are provided below for further description.

Figure 3:
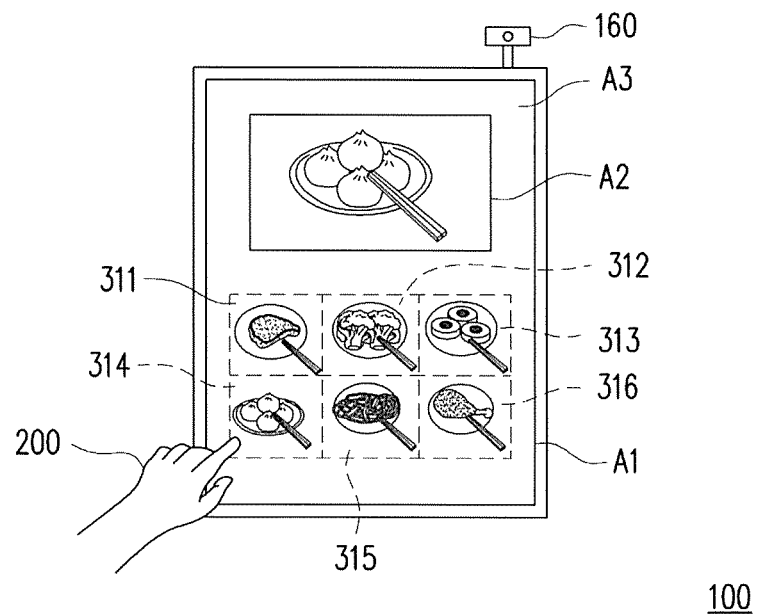
FIG. 3 is a schematic diagram of a first implementation of the electronic device.

FIG. 3 is a schematic diagram of a first implementation of the electronic device 100. The electronic device 100 of FIG. 1 is changed from a landscape display mode to a portrait display mode. In other words, the display area A2 of the display is in the landscape display mode, and the touch area A1 is disposed in a portrait mode. The static information presentation structure of the electronic device 100 of FIG. 3 has placed with a static advertising used for propaganda such as a poster or a leaflet on the non-display area A3 thereof. Such type of static advertising has a plurality of advertising configurations, for example, different meals are used to serve as different advertising configurations. The non-display area A3 of the electronic device 100 is also divided into different advertising areas 311-316 according to the advertising configurations (meals), and the advertising areas 311-316 are recorded in the data processing device of the electronic device 100. In this way, when the user touches one of the advertising areas 311-316 in the non-display area A3, for example, the advertising area 314 (e.g., small steamed bun) through the measured object 200 to perform a click operation, the data processing device determines that the click operation is located in the advertising area 314 of the non-display area A3, and controls the display 120 to play or display images, a video or information corresponding to the clicked advertising area 314 in the display area A2 in real-time to, for example, introduce an origin, a food material, a producing method, a purchase guidance or a discount message, etc., of the meal "small steamed bun" in the clicked advertising area 314, such that the electronic device 100 can be used to interact with the user to achieve a better advertising effectiveness, other than used for a pure information display.

Figure 4:
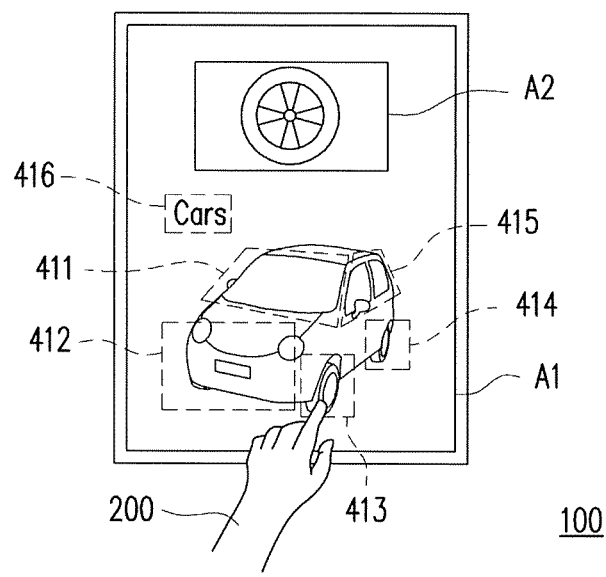
FIG. 4 is a schematic diagram of a second implementation of the electronic device.

FIG. 4 is a schematic diagram of a second implementation of the electronic device 100. The static information presentation structure of the electronic device 100 of FIG. 4 has placed with a vehicle static advertising used for propaganda on the non-display area A3 thereof, and on the vehicle static advertising, different vehicle parts are applied to serve as different advertising configurations. Namely, a plurality of advertising configurations (different vehicle parts) on the vehicle static advertising respectively correspond to advertising areas 411-415 in the non-display area A3. The user may perform a click operation on one of the advertising areas 411-416, for example, the advertising area 413 (e.g., a vehicle wheel) in the non-display area A3 through the measured object 200. When the data processing device of the electronic device 100 determines that the click operation is located in the advertising areas 413 of the non-display area A3, the display 120 is controlled to play detailed images or videos corresponding to the vehicle wheel and electronic brake equipment in the display area A2 in real-time, so as to perform image promotion of commodity specifications. In this way, the electronic device 100 of the invention may have the effect of interacting with the user through a smaller size display and a larger size touch frame. In a part of the embodiments, the data processing device of the electronic device 100 may have different advertising area configurations according to different static advertisings.

Figure 5:
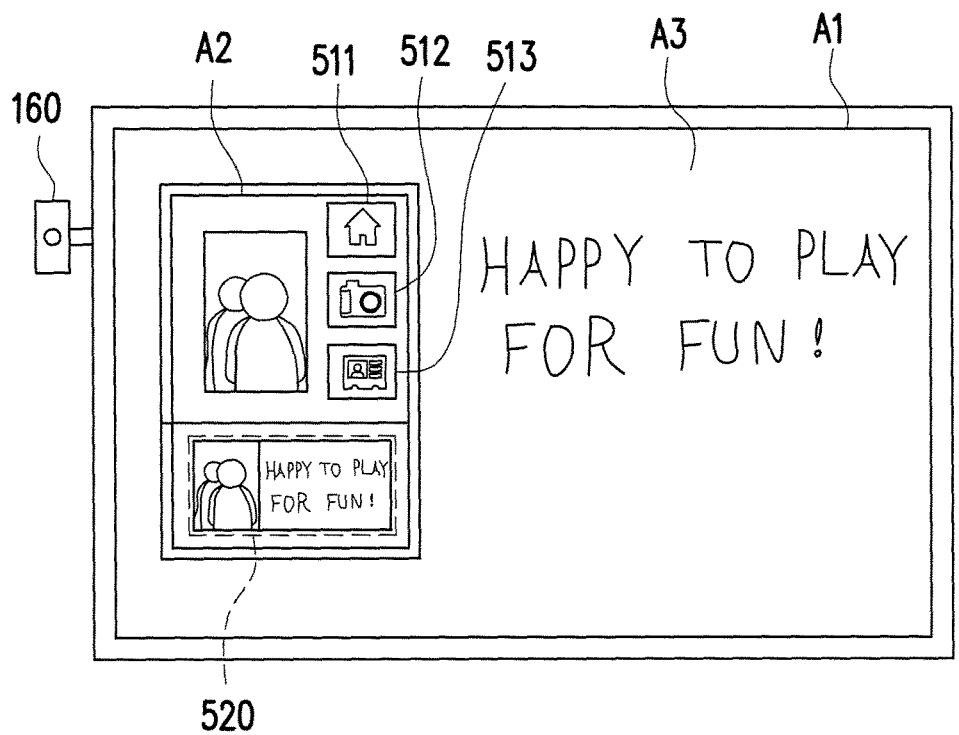
FIG. 5 is a schematic diagram of a third implementation of the electronic device.

FIG. 5 is a schematic diagram of a third implementation of the electronic device 100. In the embodiment of the invention, the touch area A1 of the electronic device 100 is disposed in the landscape mode, and the display area A2 of the display is in the portrait display mode. The display area A2 may further have a plurality of functional key areas 511-513 and a real-time preview sub-area 520. Referring to FIG. 2 and FIG. 5, when the measured object 200 (a finger) of the user clicks in the display area A2, the data processing device of the electronic device 100 executes a corresponding function operation as the click operation is located in one of the functional key areas 511-513 displayed in the display area A2. The function operation can be one of a handwriting operation, an image capturing operation or a storage operation. In this way, the display embedded in the electronic device 100 becomes a touch screen having a touch function.

For example, when the user clicks the functional key area 511, the data processing device executes a "back to home page" function, and the display area A2 displays the original home page. When the user clicks the functional key area 512, the data processing device executes a "photograph and handwriting" function, and a current image of the user is captured through the image capturing device 160 and is presented in the display area A2 to implement the image capturing operation. Then, the data processing device may continually execute the handwriting operation, and the user may write on the touch area A1 (which is mainly on the non-display area A3) by using a stylus (for example, a whiteboard stylus). In other words, the data processing device of the electronic device 100 may synchronously present a trajectory of the positions of the measured object (the whiteboard stylus/finger) on a right part of the real-time preview sub-area 520 of the display area A2 according to an algorithm (for example, a "touch area and display area transform algorithm", and present the image captured through the image capturing operation on a left part of the real-time preview sub-area 520 of the display area A2. Alternatively, the trajectories can be combined with the newly-acquired image presented on the display area A2 to produce a preview image for presenting in the real-time preview sub-area 520. In this way, the user may draw or write on the newly-acquired image or beside the newly-acquired image, so as to implement the effect of interacting with the user.

When the user completes writing and wants to store the image and the writing result, the user may click the functional key area 513 to perform a "save the current image" operation (which is also referred to as a storage operation). The data processing device 140 may further transmit a result of the aforementioned handwriting operation or image capturing operation to a remote device (for example, a user equipment or similar mobile equipment) through a wireless transmission device 150. In the present embodiment, the data processing device of the electronic device 100 may transmit the aforementioned image to the user equipment through the wireless transmission device and digital transmission software (for example, Facebook, Line, SKYPE, GOOGLE TALK, E-MAIL, Bluetooth transmission procedure, etc.) in the user equipment held by the user.

In a part of the embodiments, the data processing device of the electronic device 100 may also execute remote conference communication software to receive a file chart for the user, or share a file chart to other user in front of another electronic device located at a distance, so as to implement a remote conference. The electronic device 100 may directly implement a handwriting note on the file chart presented on the display area A2, and share the same to another electronic device through a cloud network.

Those skilled in the art may further connect the electronic device 100 with a printer, such that the acquired image and the handwriting trajectories are altogether printed as physical data, so as to implement further interaction with the user.

Figure 6:
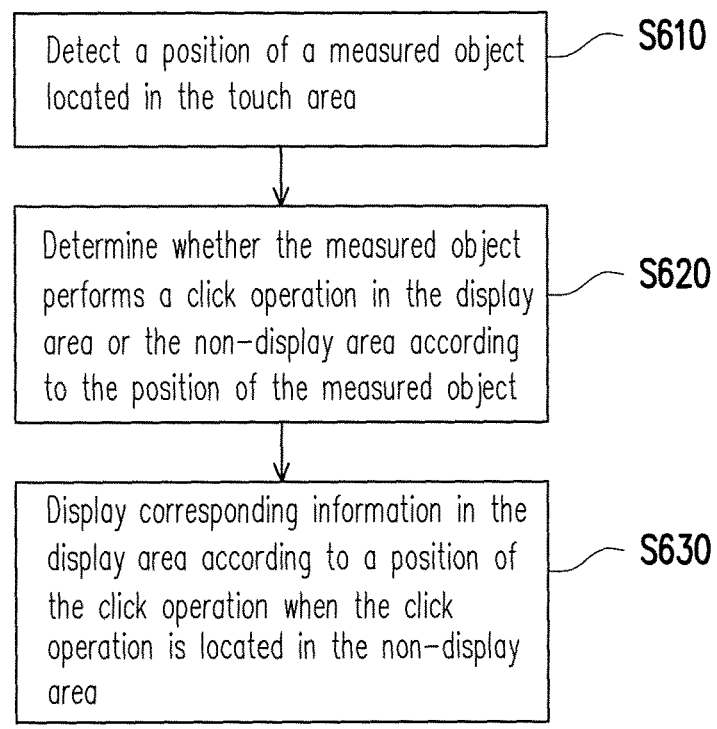
FIG. 6 is a flowchart illustrating a play and interactive method for electronic advertising.

FIG. 6 is a flowchart illustrating a play and interactive method for electronic advertising. The play and interactive method is adapted to the electronic device of FIG. 1 and FIG. 2, and the electronic device 100 includes the display area A2 and the non-display area A3. Referring to FIG. 2 and FIG. 6, in step S610, the data processing device 140 detects a position of a measured object located in the touch area A1, where the touch area A1 is composed of the display area A2 and the non-display area A3. In step S620, the data processing device 140 determines whether the measured object performs a click operation in the display area A2 or the non-display area A3 according to the position of the measured object 200. In step S630, when the click operation is determined to be located in the non-display area A3, the data processing device 140 displays information corresponding to the position of the non-display area A3 in the display area A2. Implementation methods of the step S610 and the step S620 have been revealed in the aforementioned embodiment.

In summary, the electronic device of the invention may implement diversified functions through a touch frame, the display and the static information presentation structure, such as interactive electronic advertising, a touch screen, digital writing, remote conference, to share an image to a user equipment, etc. In other words, the electronic device may implement interaction between the user and the advertising played on the electronic billboard, the digital whiteboard, etc. through a single touch frame, and a construction cost thereof is decreased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
   a touchscreen, having a touch area, and configured to provide a position of a measured object in the touch area;
   a display, having a display area set in the touch area, wherein the touch area is composed of the display area and a non-display area, and the display area is smaller than the touch area;
   a static information presentation structure, disposed on the non-display area;

a data processor, coupled to the touchscreen and the display, wherein the data processor is configured to determine whether the measured object performs an operation in the display area or the non-display area according to the position of the measured object provided by the touchscreen, and when the operation is located in the non-display area, the data processor displays corresponding information in the display area according to a position of the operation; and an image capturing device, coupled to the data processor, wherein the data processor executes a function operation according to the position of the measured object, and the function operation is one of a handwriting operation, an image capturing operation or a storage operation, wherein when the data processor executes the handwriting operation, the data processor presents a trajectory of the position of the measured object in the touch area in a real-time preview sub-area of the display area, wherein the non-display area has a touch function for performing touch operation with stylus or the handwriting operation.

2. The electronic device as claimed in claim 1, wherein the non-display area is divided into a plurality of advertising areas, and the data processor is configured to determine whether the operation is located in one of the advertising areas of the non-display area, and if yes, the information corresponding to one of the clicked advertising areas is played by the display.

3. The electronic device as claimed in claim 2, wherein the static information presentation structure comprises:

a poster placement surface, configured to place a static advertising, wherein a plurality of advertising configurations on the static advertising respectively correspond to the advertising areas in the non-display area.

4. The electronic device as claimed in claim 1, wherein the display area further comprises a plurality of functional key areas, and when the operation is located in the display area, the data processor executes a corresponding function operation as the operation is located in one of the functional key areas.

5. The electronic device as claimed in claim 1, further comprising:

a wireless transmission device, coupled to the data processor, wherein the data processor further transmits a result of the handwriting operation or the image capturing operation to a remote device through the wireless transmission device.

6. The electronic device as claimed in claim 1, wherein the touchscreen comprises an infrared touch frame disposed to encompass the touch area.

7. The electronic device as claimed in claim 5, wherein the data processor presents the trajectory of the position of the measured object in the real-time preview sub-area of the display area, and combines the trajectory with a frame presented by the display area to produce an image, and transmits the image to the remote device through the wireless transmission device.

8. The electronic device as claimed in claim 1, wherein the static information presentation structure comprises:

a writing surface, provided to the measured object to write thereon.

9. The electronic device as claimed in claim 1, wherein the display is one of a light-emitting diode display, an organic light-emitting diode display, a full color electronic paper display, and a black and white electronic paper display.

10. The electronic device as claimed in claim 1, wherein the operation is a click operation.

11. A play and interactive method for electronic advertising, adapted to an electronic device having a display area, a non-display area and a touch area covering the display area and the non-display area, the play and interactive method for electronic advertising comprises:

detecting a position of a measured object located in the touch area;

determining whether the measured object performs an operation in the non-display area according to the position of the measured object; and displaying corresponding information in the display area according to a position of the operation when the operation is located in the non-display area, wherein the non-display area has a touch function for performing touch operation with stylus or handwriting operation, wherein when the measured object performs the handwriting operation in the non-display area, a trajectory thereof is detected and synchronously presented in a real-time preview sub-area of the display area.

12. The play and interactive method for electronic advertising as claimed in claim 11, wherein the non-display area is divided into a plurality of advertising areas, and the play and interactive method for electronic advertising further comprises:

determining that the operation is located in one of the advertising areas in the non-display area, so as to play the information corresponding to one of the clicked advertising areas in real-time through the display.

13. The play and interactive method for electronic advertising as claimed in claim 11, wherein the display area further comprises a plurality of functional key areas, and when the operation is located in one of the functional key areas displayed in the display area, a corresponding function operation is executed.

14. The play and interactive method for electronic advertising as claimed in claim 11, wherein the trajectory is combined with a frame presented by the display area to produce an image, and the image is transmitted to a remote device through a wireless transmission device.

15. The play and interactive method for electronic advertising as claimed in claim 11, wherein the operation is a click operation.

* * * * *